March 17, 1970 W. E. MARTIN 3,500,659

FLEXIBLE COUPLING WITH ELASTOMER PLATE

Filed Jan. 10, 1968

INVENTOR.
W. E. MARTIN

BY William A. Murray

ATTORNEY

United States Patent Office 3,500,659
Patented Mar. 17, 1970

1

3,500,659
FLEXIBLE COUPLING WITH ELASTOMER PLATE
William E. Martin, P.O. Box 187, Kewanee, Ill. 61443
Filed Jan. 10, 1968, Ser. No. 696,849
Int. Cl. F16d 3/78
U.S. Cl. 64—13 14 Claims

ABSTRACT OF THE DISCLOSURE

A flexible coupling for connecting a pair of aligned shafts that includes a pair of couplers fixed to rotate with the respective shafts and having radial flanges thereon; an elastomer plate disposed between the flanges; and angularly spaced axially extending lugs having one of their ends mounted on the respective flanges and the other of their ends imbedded in the elastomer plate.

BACKGROUND OF THE INVENTION

This invention relates to a flexible coupler device for connecting two shafts and more particularly to a flexible coupler device that utilizes a plate of elastomer material with threaded connectors on the flanges of two rigid coupler members, each of which are fixed to rotate with one of the shafts.

Flexible couplers have heretofore been used extensively. One such coupler device includes bolts that connect the flanges of two coupler members to a central plate. The bolts are surrounded or imbedded in rubber washers in the central plate and consequently the washers permit some flexibility between the flanges and plate. Such a coupler structure is shown and described in U.S. Patent 2,879,650 which issued to the present inventor Mar. 31, 1959.

One of the disadvantages with such a structure is that the flanges of the coupler members must be specifically designed in order to receive the elastomer collars or washers. Actually, therefore, often each coupler device must be sold as an entire unit and not as an attachment to an already existing rigid coupler device. Further, while the flexible washers will offer some yieldability, in many instances this will be insufficient to overcome situations where due to large misalignment of the shafts great flexibility within the coupler is desired. Also, if failure occurs in the coupler device, it will force the bolts to wear against the coupler members to thereby eventually cause the bolts and/or coupler members to sever or fail.

SUMMARY

With the above in mind, it is the primary object of the invention to provide a flexible coupler device in which there is provision for separation of the two basic coupler members and one in which the flexible portion thereof may be inserted between and removed from, if desired, the basic metallic coupler members on the respective shafts.

Specifically it is the object of the invention to provide an elastomer plate between the flanges of two metal coupler members and to have threaded elements imbedded in the plate. The threaded elements are disposed angularly around the plate and half thereof may be threadedly attached to the flange of one coupler member and half thereof is threadedly attached to the flange of the other coupler member. In two different forms of the invention the threaded elements are internally threaded to receive studs that extend from the respective flanges. In additional forms of the invention threaded studs are imbedded in the elastomer plate and the threaded ends extend to and are adapted for connection to the respective flanges by suitable nuts.

2

DESCRIPTION OF THE PREFERRED EMBODIMENTS

Figure 1:
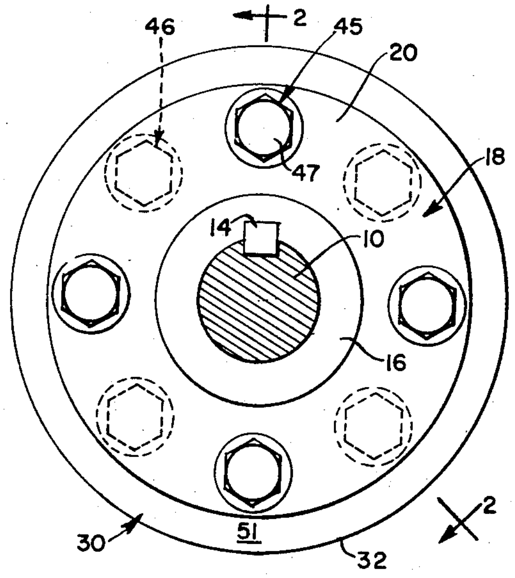
FIG. 1 is an end view of the coupler device as viewed along the axis of one of the shafts.
Figure 2:
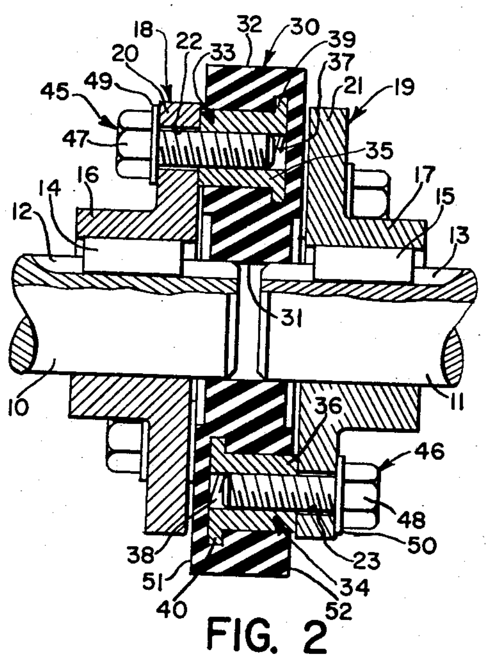
FIG. 2 is a side view, partially in section, taken along the line 2—2 of FIG. 1.

The flexible coupling, shown in FIGS. 1 and 2, drivingly connects a drive shaft 10 and a driven shaft 11. The respective shafts 10, 11 have keyways 12, 13 in their respective ends receiving keys 14, 15 that lock hub portions 16, 17 of coupler members 18, 19 on the respective shafts. The coupler members 18, 19 are metal and have radial flanges 20, 21 spaced axially apart from one another. The flanges 20, 21 have stud openings 22, 23 respectively that are, in this particular form of the invention, spaced angularly ninety degrees apart. In the assembled form of the coupler device the openings 22, 23 are angularly offset from one another forty-five degrees.

Disposed between the flanges 20, 21 is a rubber or elastomer plate 30 having inner and outer annular surfaces 31, 32 respectively, the inner surface 31 lying adjacent the outer surfaces of the ends of shafts 10, 11 and the outer surface 32 being disposed radially outwardly of the flanges 20, 21. Embedded in the plate 30 is a series of metal connector elements, one part 33 being aligned with openings 22 and a second part 34 being aligned with openings 23. The elements 33, 34 have shank potrions 35, 36 with internal threaded surfaces 37, 38 and radial flange portions 39, 40 that serve as shoulders to create strong mechanical bonds between the elements 33, 34 and the elastomer plate 30. A suitable chemical or bonding compound is also used to further strengthen the bonding between the plate and elements 33, 34.

Threadedly received in the threaded surfaces 37, 38 are bolts 45, 46 respectively that extend through the openings 22, 23 and have their heads 47, 48 bearing against the flanges 20, 21, there also being provided suitable washers 49, 50 between the heads 47, 48 and the respective flanges. Viewing FIG. 1, it becomes apparent that the connector elements 33, 34 are each individually suspended in the elastomer plate 30 and consequently are independently suspended with respect to each other. Thus, the attachment elements or bolts 45, 46 when connected to the elements 33, 34 are also independently suspended in the plate 30.

Reviewing FIG. 2, it will be noted that the flanges 39, 40 project axially outwardly of the radial faces 51, 52 of the elastomer plate. Consequently, when the coupler device is assembled the bolts 45, 46 are drawn tightly into the connector elements 33, 34 until the flanges 20, 21 bear rigidly against the ends of the shank portions 33, 34 and thus the mere assembling of the unit will create no tension between the elastomer material and the metal connector elements 33, 34. It should here be noted there are small axial gaps between opposite sides 51, 52 of the elastomer plate and the radial surfaces of the respective flanges 20, 21.

In operation, axial movement of one flange relative to the other will be compensated for by yielding of the flexible plate. Any excess torsional load between the coupler members will be compensated for by the connector elements yielding within the elastomer plate. Hence, any type of momentary relative movement between the shafts ie to either misalignment of the shafts 10, 11, or possibly due to excessive shock or overloads will be compensated for by distortion within the flexible plate 32. Being resilient, the plate 30 will first yield and then tend to force the respective shafts back into alignment.

Figures 3, 4, 5:
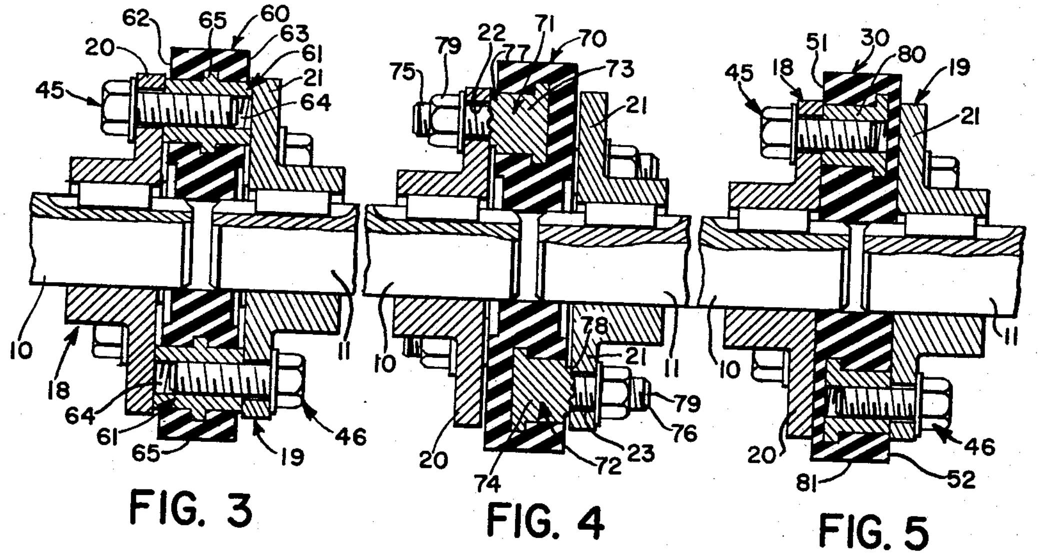
FIG. 3 is a sectional view similar to FIG. 2, but of smaller scale, showing a modified form of the invention.
FIG. 4 is a sectional view similar to FIG. 3, but showing a further form of the invention.
FIG. 5 is a sectional view similar to FIG. 4, but showing still a further form of the invention.

Referring now to FIG. 3, there is provided an elastomer late 60, somewhat similar to the elastomer plate 32 and having imbedded therein connector elements 61. The elements 61 have axial lengths greater than the width or axial length of the elastomer plate 60 so that opposite ends thereof project outwardly beyond the radial surfaces 62, 63 of the elastomer plate. Ends of the elements 61 bear against the flanges 20, 21 of the coupler members 18, 19. The elements 61 are threaded at 64 throughout their lengths so that bolts 45, 46 extending through the respective flanges 21, 22 may be threadedly inserted into either end of the elements. The elements 61 are provided with annular central collars 65 which effect a strong mechanical bond within the plate 60. A chemical bond is also provided between the plate 60 and the outer surfaces of the elements 61.

The coupling shown in FIG. 3 differs somewhat from the coupling shown in FIGS. 1 and 2 in that the bolts may be drawn tightly into the elements so that the ends of elements 61 bear flush against the flanges 20, 21. Thus there is permited little if any relative axial movment between the flanges. The elastomer 60 will, however, deform sufficiently to permit relative angular or torsional novement between the flanges. It should, however, be recognized that the entire coupling may move axially, if required, along the shafts 10, 11 to accommodate slight axial movement between the shafts.

Referring now to FIG. 4, an elastomer plate 70 is provided with connector elements 71, 72 that are alternately paced angularly around the plate 70 much in the manner of elements 35, 36 of FIG. 1. The elements 71, 72 have round butt and shank portions 73, 74 imbedded or anchored in the plate 70 and threaded stud portions 75, 76 that project outwardly in axial directions through the openings 22, 23 in the respective flanges 20, 21. The elements 71, 72 have small annular shoulders 77, 78 projecting from the radial faces of the elastomer plate 70 and bearing against the surfaces of the respective flanges 20, 21. The shoulders retain slight axial gaps between opposite sides of the elastomer plate 70 and the respective adjacent inner surfaces of flanges 20, 21. Nut and washer combinations 79 are provided for the stud portions 75, 76 and rigidly fix the flanges 20, 21 to the threaded stud portions 75, 76.

In operation this form of the invention is similar to that of the form shown in FIGS. 1 and 2. In assembly his form requires a wider separation of the coupler parts 18, 19 for installation. Often, due to space limitations such separation is not permitted and the form of the invention shown in FIGS .1 and 2 is preferred.

FIG. 5 shows a form of the invention quite similar to that shown in FIGS. 1 and 2. The elastomer plate 30 is identical to that of the first form as is the coupler members 18, 19. In the form of FIG. 5, however, connector elements 80, 81 have their ends terminating flush with the radial surfaces 51, 52 and consequently the bolts 45, 46 may draw the flanges 20, 21 tightly against the surfaces 51, 52 respectively.

The structure of this form, in comparison to that shown in FIGS. 1 and 2, may be utilized to sustain heavier torque loads without ripping the elements 80, 81 from the elastomer plate 80. However, the structure does not afford as high a degree of flexing or yielding as the previous structures. Consequently, depending on the nature and characteristics of the drive, one form may be desirable over the other.

What is claimed is:

1. A flexible connecting means for use between a pair of rigid coupler members supported on and adapted to rotate with a pair of substantially axially aligned shafts, the connecting means comprising: an elastomer layer disposed between the members; a plurality of rigid connector elements, each of which is embedded in and independently suspended with respect to each other in the layer radially from the shafts, with each having a single axially extending exposed threaded surface; and the attachment elements having complementary threaded surfaces received by the exposed threaded surfaces, the attachment elements having parts thereof operatively engageable with both of the coupler members whereby the members may be threadedly connected to the layer and each of said attachment elements may be individually and resiliently suspended by the elastomer layer.

2. The structure as set forth in claim 1 in which the exposed threaded surfaces of the elements imbedded in the elastomer layer are internally threaded surfaces; and the attachment elements are threaded studs extending between the respective coupler members and elastomer layer and having heads thereon.

3. The structure as set forth in claim 13 in which the internally threaded elements imbedded in the layer are angularly spaced in respect to the respective shafts and are adapted for connection to the attachment elements on opposite sides of the layer, and the attachment elements extend through both coupler members.

4. The structure as set forth in claim 3 in which the internally threaded elements have portions projecting outwardly of the elastomer layer with abutments thereon for engaging the coupler members whereby the coupler members and internally threaded elements may be rigidly secured to one another by the attachment elements.

3. The structure as set forth in claim 13 in which the internally threaded elements are adapted to be alternately connected in respect to their angular disposition to the respective coupler members.

6. The structure as set forth in claim 1 in which the rigid elements have shank portions imbedded in the elastomer layer and threaded external ends projecting outwardly of the elastomer layer and to opposite sides thereof.

7. Structure as set forth in claim 5 in which the coupler members are of the type having axially extending openings for passing threaded ends and the attachment elements are nuts that receive the threaded ends and connect the coupler members to the elastomer layer.

8. Structure as set forth in claim 7 in which the shank portions project outwardly of the elastomer layer and have shoulders for engaging the coupler members.

9. Structure as set forth in claim 1 in which the coupler members are of the type having respective radial flanges axially spaced apart and axial openings spaced from the shafts; the elastomer layer is positioned in the gap between the flanges, and the connector elements are rigid elements imbedded in the elastomer layer with the axially extending threaded surfaces being internally threaded surfaces aligned with the axial openings of the flanges; and the attachment elements are bolts that extend through the axial openings and are threadedly coupled to the rigid elements.

10. The structure as set forth in claim 9 in which the elastomer layer has opposite radial surfaces, and the internally threaded elements project outwardly of the opposite surfaces and are adapted to bear against the coupler members for maintaining a gap between the respective surfaces and the adjacent flanges.

11. The structure as set forth in claim 1 in which the coupler members are of the type having a pair of radial flanges spaced axially apart to provide an axial gap therebetween and axial openings therein spaced radially from the shafts; the elastomer layer is disposed between the flanges and has opposite radial surfaces facing the respective flanges; and the connector elements are axially extending rigid elements with anchor ends imbedded in the layer and having external threaded portions projecting therefrom through the axial openings in the flanges; and the attachment elements are nut means received on the end portions for attaching the flanges thereto.

12. The structure as set forth in claim 11 in which the rigid elements have abutment portions thereon external of the layer for retaining axial gaps between the layer and the respective flanges.

13. A flexible connecting means for use between a pair of rigid coupler members supported on and adapted to rotate with a pair of substantially axially aligned shafts, the connecting means comprising: an elastomer layer disposed between the members; a plurality of internally threaded elements embedded in the layer radially from the shaft with opposite ends opening to opposite sides of and projecting beyond the sides of the elastomer layer; and threaded studs extending from the coupler members and received in opposite ends of the threaded elements so as to create threaded connections between the coupler members and the elastomer layer.

14. A flexible connecting means for use in connecting a pair of substantially aligned shafts comprising: a pair of rigid axially spaced coupler members having radial flanges supported on and adapted to rotate with the shafts; the flanges having axial openings spaced radially from the shafts; an elastomer layer disposed in the axial gap between the flanges and having opposite radial surfaces facing the respective flanges; a plurality of internally threaded elements embedded in the layer radially from the sha with opposite ends opening to opposite sides of the lay and projecting axially beyond the respective radial su faces; and bolts extending through the flange openin and received in the threaded openings for drawing tl flanges into abutment with the ends of the rigid element

References Cited

UNITED STATES PATENTS

| | | | |
|---|---|---|---|
| 1,642,775 | 9/1927 | Henry | 64—13 |
| 2,271,568 | 2/1942 | Olson | 64—1 |
| 2,945,365 | 7/1960 | Ulderup et al. | 64—1 |

FOREIGN PATENTS

| | | |
|---|---|---|
| 863,006 | 12/1940 | France. |
| 842,126 | 7/1960 | Great Britain. |
| 943,445 | 10/1962 | Great Britain. |

FRED C. MATTERN, Jr., Primary Examiner

M. A. ANTONAKAS, Primary Examiner

U.S. Cl. X.R.

64—27